United States Patent [19]

Howard

[11] Patent Number: 4,755,897

[45] Date of Patent: Jul. 5, 1988

[54] MAGNETORESISTIVE SENSOR WITH IMPROVED ANTIFERROMAGNETIC FILM

[75] Inventor: James K. Howard, Morgan Hill, Calif.

[73] Assignee: International Business Machines Corporation, Armonk, N.Y.

[21] Appl. No.: 43,675

[22] Filed: Apr. 28, 1987

[51] Int. Cl.$^4$ .............................. G11B 5/12; G11B 5/30
[52] U.S. Cl. ...................................... 360/113; 360/110
[58] Field of Search .............. 360/110, 113; 338/32 R; 324/252

[56] References Cited

U.S. PATENT DOCUMENTS

| | | | |
|---|---|---|---|
| 3,959,032 | 5/1976 | Koester et al. | 148/105 |
| 4,089,711 | 5/1978 | Saito et al. | 148/11.5 R |
| 4,103,315 | 7/1978 | Hempstead et al. | 360/110 |
| 4,663,685 | 5/1987 | Tsang | 360/113 |

OTHER PUBLICATIONS

"Magnetics of Small Magnetoresistive Sensors" by Tsang, J. Appl. Phys. 55(6), Mar. 15, 1984, pp. 2226–2231.

"Exchange Induced Unidirectional Anisotropy at FeMn-Ni$_{80}$Fe$_{20}$ Interfaces", by Tsang et al., J. Appl. Phys. 52(3), Mar. 1981, pp. 2471–2473.

"Unidirectional Anisotropy in Nickel-Iron Films by Exchange Coupling . . . ", by Hempstead et al., IEEE Transaction on Magnetics, vol. Mag.-14, No. 5, Sep. '78, pp. 521–523.

Primary Examiner—John H. Wolff
Attorney, Agent, or Firm—Thomas R. Berthold

[57] ABSTRACT

An improved thin film magnetoresistive (MR) sensor uses an alloy comprising Fe, Mn and Cr as an antiferromagnetic layer to provide a longitudinal exchange bias in the ferromagnetic MR layer. Sufficient exchange biasing is provided and the FeMnCr layer exhibits excellent corrosion resistance.

4 Claims, 3 Drawing Sheets

MAGNETORESISTIVE SENSOR WITH IMPROVED ANTIFERROMAGNETIC FILM

FIELD OF THE INVENTION

This invention relates to magnetoresistive (MR) read sensors, and in particular to a MR read sensor in which an improved antiferromagnetic film provides a longitudinal bias field in the ferromagnetic MR film of the sensor.

DESCRIPTION OF THE PRIOR ART

A general description of the principle of operation of MR sensors in magnetic recording systems is provided by Tsang in "Magnetics of Small Magnetoresistive Sensors", *J. App. Phys.*, Vol. 55(6), Mar. 15, 1984, pp. 2226-2231.

A MR sensor for reading information signals from a magnetic recording medium is described in U.S. Pat. No. 4,103,315 by Hempstead, et al., which is assigned to the same assignee as this application. The U.S. Pat. No. 4,103,315 describes a MR read sensor which utilizes antiferromagnetic-ferromagnetic exchange coupling to produce a uniform longitudinal bias in the MR layer of the sensor. The exchange coupling between the antiferromagnetic and ferromagnetic layers creates a single domain state in the ferromagnetic layer and thereby suppresses the so-called Barkhausen noise associated with domain activity. The materials suggested by U.S. Pat. No. 4,103,315 are nickel-iron (NiFe) as the ferromagnetic MR layer and a face-centered-cubic (FCC) phase (gamma phase) of manganese (MN) alloy as the antiferromagnetic layer. The U.S. Pat. No. 4,103,315 also suggests that alloys of Mn with cobalt (Co), copper (Cu), germanium (Ge), nickel (Ni) and rhodium (Rh), may produce a stable gamma phase Mn alloy when deposited on NiFe, but indicates that chromium-manganese (CrMn) and manganese-palladium (MnPd) alloys failed to produce a stable gamma phase.

Of the possible gamma Mn alloys, iron-manganese (FeMn) appears to exhibit the greatest ability to exchange couple with the NiFe layer. The strength of the exchange bias field for exchange coupled films of sputter deposited NiFe/FeMn and FeMn/NiFe has been studied by Tsang, et al. in "Exchange Induced Unidirectional Anisotropy at FeMn-Ni$_{80}$Fe$_{20}$ Interfaces", *J. Appl. Phys.* Vol. 52 (3), March 1981, pp. 2471-2473.

Commonly assigned co-pending application Ser. No. 766,157 describes a MR sensor with an FeMn antiferromagnetic layer divided into separate end portions for providing an exchange bias primarily in the corresponding end portions.

One of the problems with the use of FeMn as the antiferromagnetic layer is its susceptibility to corrosion. The material is exposed to corrosive environments during the thin film fabrication processes and during operation of the magnetic recording system. Thus it is desirable to improve the MR sensor by utilizing an antiferromagnetic material which provides corrosion resistance properties comparable to those of NiFe and sufficient exchange coupling with the NiFe MR layer.

SUMMARY OF THE INVENTION

The invention is an improved MR sensor wherein the antiferromagnetic layer formed in direct contact with the MR layer is an alloy comprising Fe, Mn and Cr. The improved antiferromagnetic layer composition produces both a sufficient exchange bias and a corrosion resistance comparable to that of the NiFe layer.

For a fuller understanding of the nature and advantages of the present invention reference should be made to the following detailed description taken in conjunction with the accompanying drawings.

DESCRIPTION OF THE PREFERRED EMBODIMENT

Figure 1:
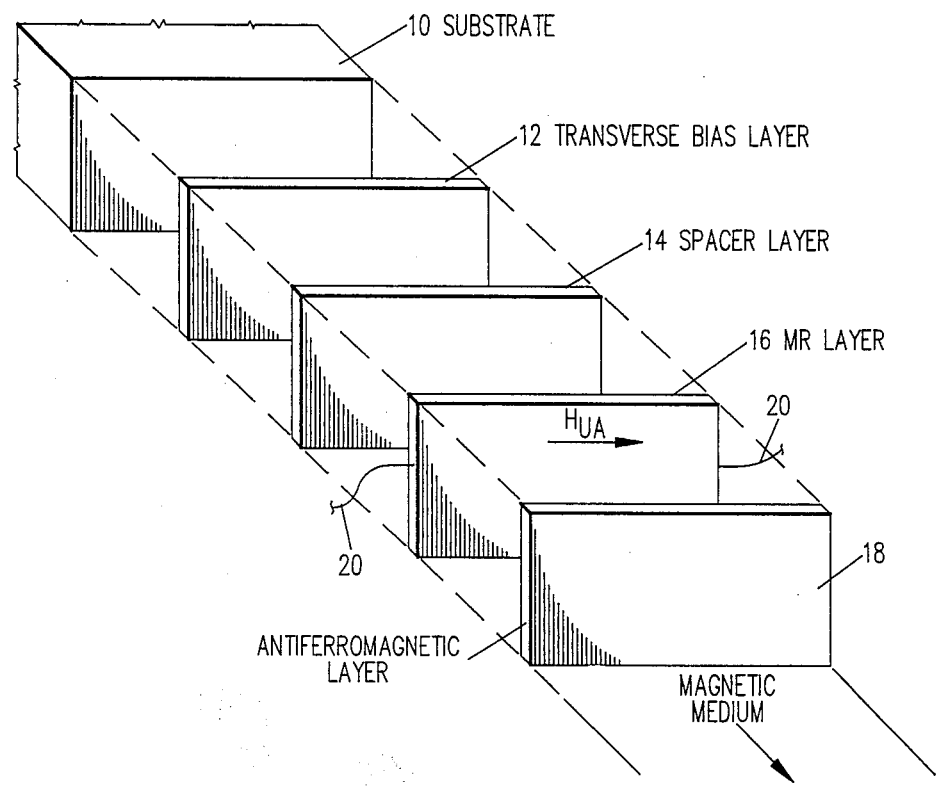
FIG. 1 is a schematic representation of a prior art thin film MR sensor.

As illustrated in FIG. 1, a typical thin film MR sensor comprises a substrate 10, a transverse bias layer 12, a spacer layer 14, a MR layer 16 and an antiferromagnetic layer 18. The MR layer 16 which is formed of ferromagnetic material such as Ni$_{80}$Fe$_{20}$, is attached to electrical conductors 20 and provides an output current. The output current from MR layer 16 is a signal which enables a separate sensing circuit to determine resistance changes in the MR layer. The resistance changes are a function of changes in the magnetic fields intercepted by MR layer 16 from recorded data on the magnetic storage medium.

In order to assure that MR layer 16 has uniaxial anisotropy an antiferromagnetic layer is formed on MR layer 16. The antiferromagnetic layer, which in the prior art may be the gamma phase of Mn alloys, creates an interface exchange coupling with the ferromagnetic MR layer 16. This results in a longitudinal exchange bias field ($H_{UA}$) in MR layer 16 and creates a single magnetic domain state in MR layer 16. The existence of a single magnetic domain state in MR layer 16 is essential to suppress Barkhausen noise which is associated with MR materials which exhibit multiple magnetic domain states.

The transverse bias layer 12 provides a magnetic field oriented generally perpendicular to the medium so as to slightly bias the magnetic field in MR layer 16 in a direction non-parallel to the medium. This transverse bias maintains the MR layer 16 in a linear response mode such that the current output is essentially a linear function of the resistance changes. As is known in the art, the transverse bias can be provided by shunt biasing, soft film biasing, or permanent magnet biasing.

A more comprehensive description of the MR sensor of FIG. 1 and alternative embodiments of it are described in U.S. Pat. No. 4,103,315. The MR sensor shown in FIG. 1 is similar to that described in the co-pending Ser. No. 766,157 application with the exception that in the Ser. No. 766,157 application the antiferromagnetic layer 18 is divided into two separate end portions with a space between so as to provide longitudinal exchange bias primarily in the end regions of MR layer 16.

In order to provide an improved antiferromagnetic layer in the MR sensor various ternary FeMn based alloys were prepared as thin film structures by RF sputter deposition in a uniform magnetic film of 100 Gauss. The power density, system pressure and substrate temperature were fixed at 2.6 w/cm$^2$, 25 millitorr and 50°

C., respectively. The base pressure of the system was approximately $5 \times 10^{-9}$ Torr. The substrates were semiconductor grade single crystal silicon, glass or quartz which were first solvent cleaned and then cleaned by exposure to a glow discharge prior to deposition. Films of nickel-iron ($Ni_{81}Fe_{19}$) were deposited on the substrates at a rate of approximately 1 Angstrom per second. The thickness of the NiFe films varied from approximately 200 Angstroms to 600 Angstroms. A bias voltage of −50 volts was used to reduce the residual gas contamination. Ternary alloys with FeMn were then deposited on the NiFe layers by cosputtering a third target and an $Fe_{50}Mn_{50}$ target. The sample materials prepared in accordance with this process were then tested to measure the exchange bias ($H_{UA}$) in the NiFe MR layer and the corrosion resistance of the antiferromagnetic layer.

Figure 2:
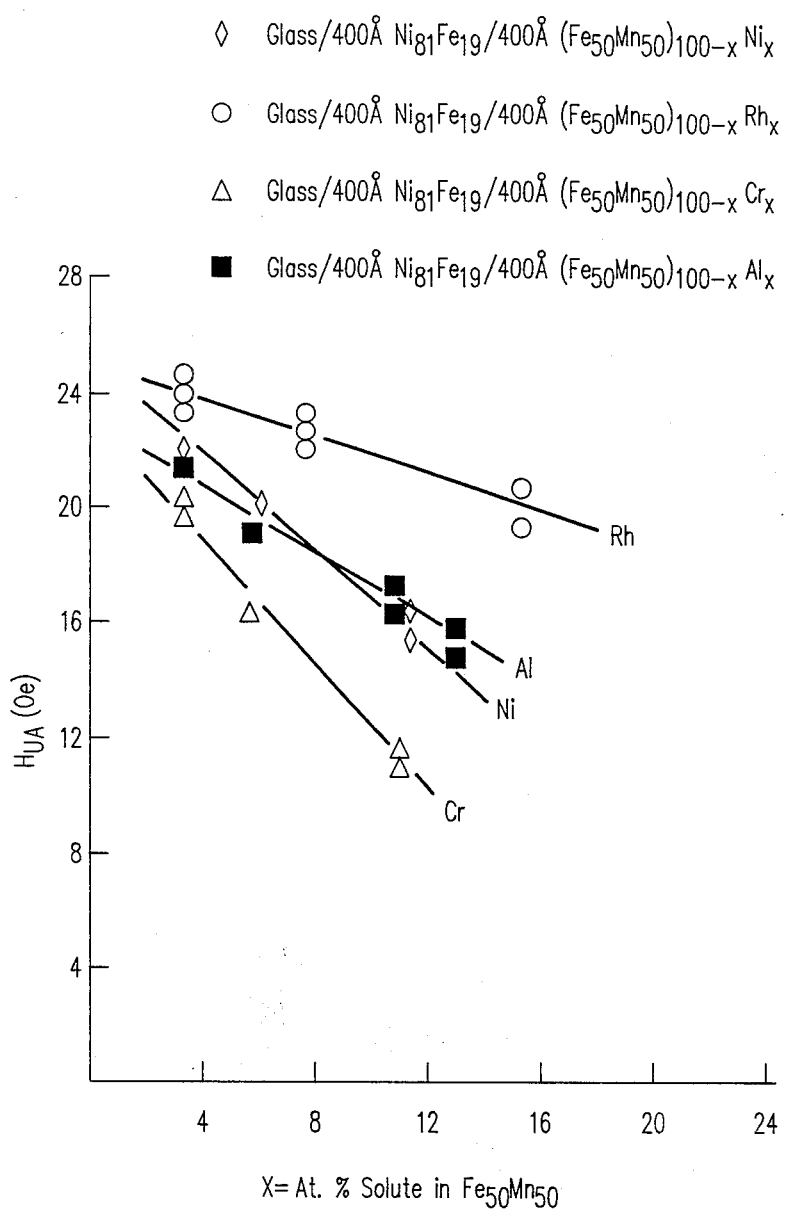
FIG. 2 is a graph of loop shift or exchange bias ($H_{UA}$) in a NiFe layer as a function of the percentage solute for various solutes present in a FeMn based alloy antiferromagnetic layer.

The exchange bias field of the NiFe MR layer is illustrated in FIG. 2 as a function of various percentages of the ternary additives of Rh, Ni, Al and Cr to FeMn in the antiferromagnetic layer. The $H_{UA}$ value for $Fe_{50}Mn_{50}$, normalized to the conditions of FIG. 2, is approximately 24 Oersteds (Oe). As shown in FIG. 2, Rh has the least effect on reducing the exchange bias. The data shown in FIG. 2 indicates that all of the solutes are capable of use in a FeMn-based ternary alloy antiferromagnetic layer, provided the atomic percent (at. %) concentration of the ternary additive is relatively small.

Figure 3:
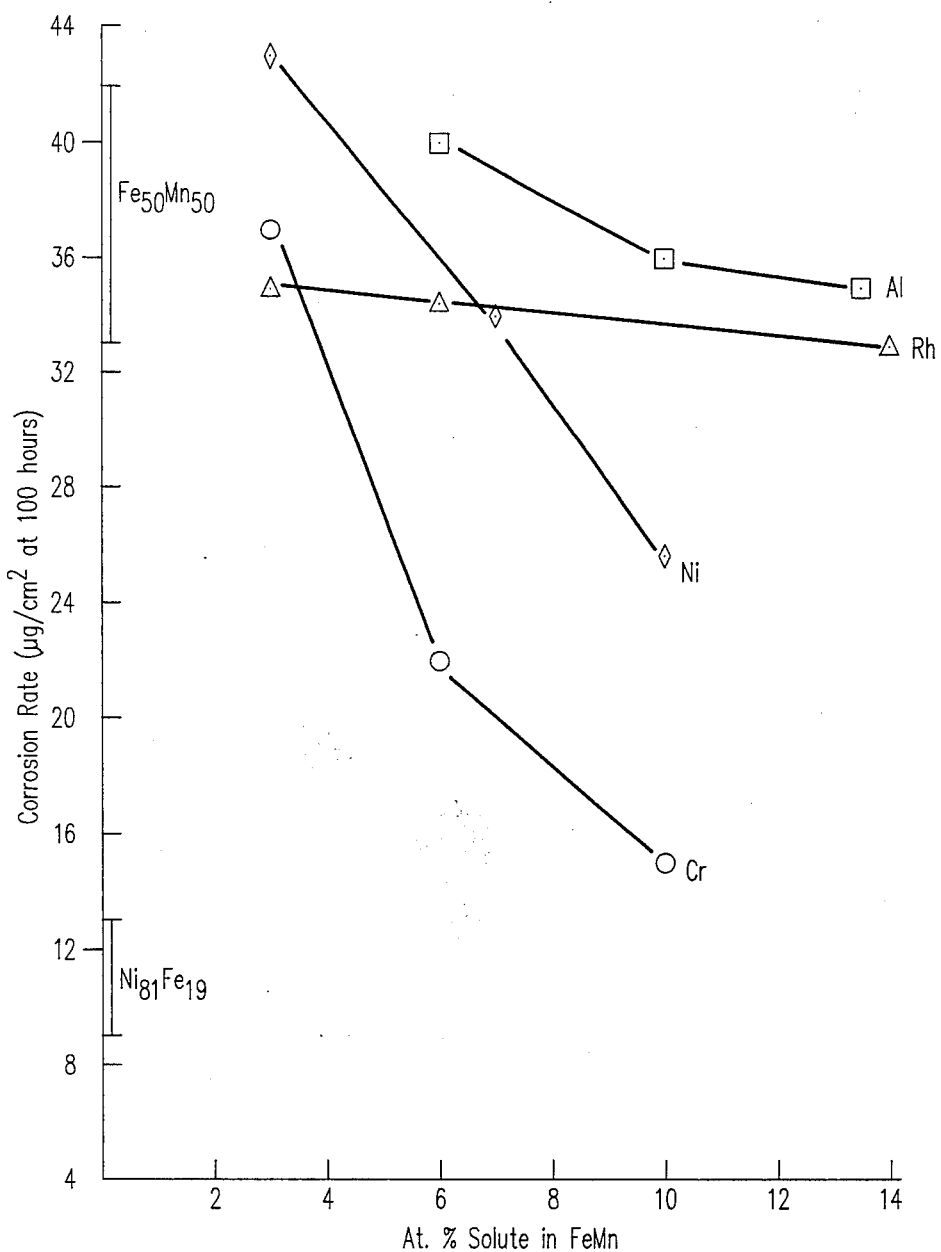
FIG. 3 is a graph of corrosion rate as a function of percentage solute for various solutes in the FeMn alloy.

In order to determine the corrosion resistance of the various ternary alloy films, the films were exposed to an atmosphere of $SO_2$, $NO_2$, $H_2S$ and HCl at 70% relative humidity and 28° C. for 100 hours. The corrosion rates, which are given as the amount of weight gain of the films per surface area, for NiFe, FeMn, and the various FeMn-based ternary alloy films are shown in FIG. 3. The corrosion rate of $Ni_{81}Fe_{19}$ is about 11 micrograms/$cm^2$ and $Fe_{50}Mn_{50}$ about 37 micrograms/$cm^2$. The addition of Cr to $Fe_{50}Mn_{50}$ decreases the corrosion rate of $Fe_{50}MN_{50}$ from about 37 micrograms/$cm^2$ (for 3 at. % Cr) to about 15 micrograms/$cm^2$ (for 10 at. % Cr). The addition of approximately 10 at. % Ni decreases the corrosion rate to a level below that of FeMn but significantly higher than that achieved with 10 at. % Cr. As shown by FIG. 3, the addition of Rh or Al to FeMn had little or no effect on the corrosion rate. Since it is known that Rh additions to NiFe cause a significant decrease in the corrosion rate, the negligible effect of Rh on the corrosion rate of FeMn is somewhat surprising. Similarly, Al was initially a likely candidate for increasing the corrosion resistance of FeMn because of its use in passivating steel. However, the FeMnAl alloy actually had little effect on the atmospheric corrosion rate of FeMn.

Based upon the experimental results obtained, as shown in FIGS. 2 and 3, an antiferromagnetic layer of FeMnCr, with Cr present in an amount greater than approximately 3 at. % and less than approximately 12 at. %, results in a MR sensor with sufficient exchange bias in the MR layer and with a significantly improved corrosion resistance, a corrosion resistance which approaches that of the NiFe MR layer. While it has been previously suggested in U.S. Pat. No. 4,103,315 that a CrMn alloy would not result in a gamma phase Mn alloy, the results of FIG. 2 indicate that with a Cr concentration of less than approximately 12 at. % in a ($Fe_{50}Mn_{50}$) Cr antiferromagnetic film, there is sufficient exchange coupling, indicating that the FeMnCr alloy is in the gamma phase.

With the discovery that small additions of Cr to FeMn result in a corrosion resistant antiferromagnetic layer which is capable of inducing a longitudinal bias in a NiFe layer, it is possible to conclude that yttrium (Y), titanium (Ti), or silicon (Si), either as ternary or quaternary additions to FeMn or as a quaternary addition to FeMnCr, may also perform as well as Cr because all of these elements are known to produce stable passivating oxides.

While the preferred embodiment of the present invention has been illustrated in detail, it should be apparent that modifications and adaptions to this embodiment may occur to one skilled in the art without departing from the scope of the present invention as set forth in the following claims.

What is claimed is:

1. An improved magnetoresistive sensor of the type having an antiferromagnetic layer in direct contact with a magnetoresistive ferromagnetic layer for inducing a longitudinal bias in the ferromagnetic layer, wherein the improvement is an antiferromagnetic layer comprising an alloy of manganese (Mn), iron (Fe), and chromium (Cr), with chromium present in the alloy in an amount greater than approximately 3 atomic percent and less than approximately 12 atomic percent.

2. The improved sensor according to claim 1 wherein said ferromagnetic layer is an alloy comprising nickel and iron.

3. A magnetoresistive read sensor comprising:
   a thin magnetoresistive layer of ferromagnetic material;
   a thin layer of antiferromagnetic material in direct contact with the magnetoresistive layer for inducing a magnetic exchange bias in the magnetoresistive layer, the antiferromagnetic material being an alloy comprising manganese (Mn), iron (Fe), and chromium (Cr), with Cr present in an amount greater than approximately 3 atomic percent and less than approximately 12 atomic percent; and
   means for producing a transverse bias in said magnetoresistive layer whereby upon connection of a sensing means to said magnetoresistive layer, resistance changes in said magnetoresistive layer can be determined as a function of the magnetic fields intercepted by said magnetoresistive layer.

4. The sensor according to claim 3 wherein said magnetoresistive layer is an alloy comprising nickel and iron.

* * * * *